E. H. WHEELER.
WAGON-BRAKE LEVER.
No. 175,887.              Patented April 11, 1876.
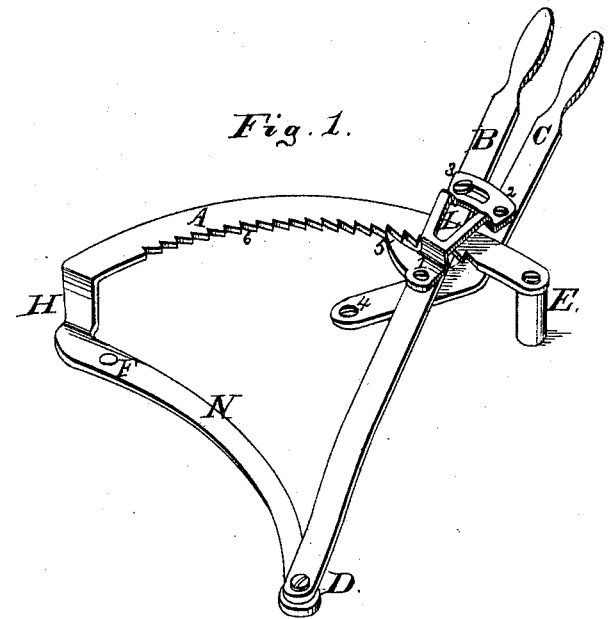
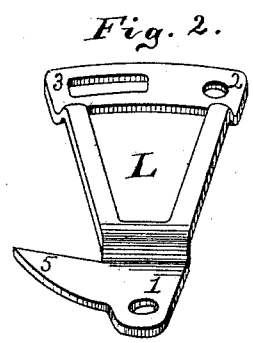
Witnesses
S. M. James
John McKim
Inventor
Elisha H. Wheeler

UNITED STATES PATENT OFFICE.

ELISHA H. WHEELER, OF CANTON, MISSOURI.

IMPROVEMENT IN WAGON-BRAKE LEVERS.

Specification forming part of Letters Patent No. 175,887, dated April 11, 1876; application filed December 31, 1875.

*To all whom it may concern:*

Be it known that I, ELISHA H. WHEELER, of the town of Canton, Lewis county, Missouri, have invented certain new and useful Improvements in Wagon-Brakes; and I hereby declare the following to be a full and exact description thereof, reference being had to the annexed drawings, of which—

Figure 1 is a perspective view of the brake, and Fig. 2 is a perspective view of the pawl-bracket.

That others skilled in the art may be able to make and use my invention, I will now describe its construction and operation.

I construct a segment of a circle, A, Fig. 1, provided with ratchet-teeth upon its inner edge, marked 6. At the rear end of the segment A I make shoulder H, terminating in an arm, N, perforated with holes at F and D, the hole D being central to the circle of segment A. I then construct a collar, E, of same height as shoulder H. The said segment A is to be attached to the wagon box or body by means of bolts through the body and holes E F D. I then construct a lever, B, perforated with holes at D, 1 and 3. I also make a lever, C, perforated with holes at 2, 1, and 4, and bent to an obtuse angle at its lower end, so as to cross lever B at 1, all of which is seen in Fig. 1. I then construct a pawl-bracket, L, recessed in its central part, so as to permit the passage of the segment A between it and the levers B and C. Said bracket is provided with a pawl, 5, and is perforated with holes at 1 and 2, and slot at 3. The several parts are united together by rivets or bolts at 1 and 2, and a stud at 3. The lower end of lever B is secured in place by bolt D.

Operation: The brake, as above described, being united to the wagon lock or brake by a connecting-rod, attached to lever C at hole 4, the levers B and C are then closed together by the operator, which action moves the pawl-bracket backward the length of the slot 3, and throws the pawl 5 out of the ratchet-teeth 6. The levers B and C are thus free to move forward toward E, and when the desired pressure of the wagon-brake is obtained, the operator lets go of lever C, when the tension upon the lever C of the connecting-rod causes it to move to the position as seen in the drawings, Fig. 1, the pawl 5 being closed into the ratchet-teeth 6. When it is desired to release the brake the operator closes the levers B and C together, which throws the pawl 5 out of the ratchet-teeth 6, and permits the free movement of the levers B and C backward to shoulder H.

I do not claim the segment A, provided with ratchet-teeth 6, because the same has long been known and used; but What I do claim as my invention, and desire to secure by Letters Patent, is—

1. The combination of levers B and C, when so constructed and arranged that lever C crosses lever B, and is united to it by a bolt or rivet at 1, lever C being provided with a hole, 4, for the attachment of a connecting-rod, as set forth.

2. The combination of levers B and C, when so constructed that lever C shall cross lever B at 1, and be united thereto by a bolt or rivet, 1, together with pawl-bracket L and ratchet-segment A, when made and operating in manner as set forth.

Witness my hand this December 22, 1875.

ELISHA H. WHEELER.

Witnesses:
J. M. JAMES,
JOHN McKIM.